United States Patent [19]

Isikawa

[11] Patent Number: 4,972,333

[45] Date of Patent: Nov. 20, 1990

[54] TIME INTERNAL MEASURING APPARATUS AND METHOD FOR A REVOLUTION SENSOR

[75] Inventor: Masataka Ishikawa, Higashimatsuyama, Japan

[73] Assignee: Diesel Kiki Co., Ltd., Tokyo, Japan

[21] Appl. No.: 116,348

[22] Filed: Nov. 4, 1987

[30] Foreign Application Priority Data

Nov. 7, 1986 [JP] Japan .................... 61-265314

[51] Int. Cl.$^5$ .................. G01P 21/00; G01P 3/481
[52] U.S. Cl. .................... 364/571.07; 364/571.02; 364/569; 364/431.05; 123/480; 377/50
[58] Field of Search ........... 364/559, 565, 569, 571.02, 364/571.04, 571.05, 571.08, 571.07, 431.03, 431.04, 431.05; 123/480, 486; 377/50; 375/10

[56] References Cited

U.S. PATENT DOCUMENTS

| | | | |
|---|---|---|---|
| 4,197,585 | 4/1980 | Moorey et al. | 364/571.08 |
| 4,216,419 | 8/1980 | van Dam et al. | 364/571.04 |
| 4,303,984 | 12/1981 | Houvig | 364/571.07 |
| 4,366,541 | 12/1982 | Mouri et al. | 364/571.07 |
| 4,418,392 | 11/1983 | Hata | 364/571.07 |
| 4,581,713 | 4/1986 | Fennel | 364/571.04 |
| 4,633,419 | 12/1986 | Niiho et al. | 364/559 |
| 4,669,052 | 5/1987 | Bianco | 364/571.04 |

Primary Examiner—Parshotam S. Lall
Assistant Examiner—V. Trans
Attorney, Agent, or Firm—Birch, Stewart, Kolasch and Birch

[57] ABSTRACT

A scale pulse signal is produced whenever a revolution sensor detects a unit revolution angle formed an angle between cogs or poles. A time interval between the scale pulse signal is affected by an error in the formed angle. The time interval between the scale pulse signals can be corrected by using a correction coefficient determined by an actual value of the unit revolution angle detected by the revolution sensor and by a design value of the unit revolution angle, so that the time interval corresponds to the design value of the unit revolution angle.

8 Claims, 4 Drawing Sheets

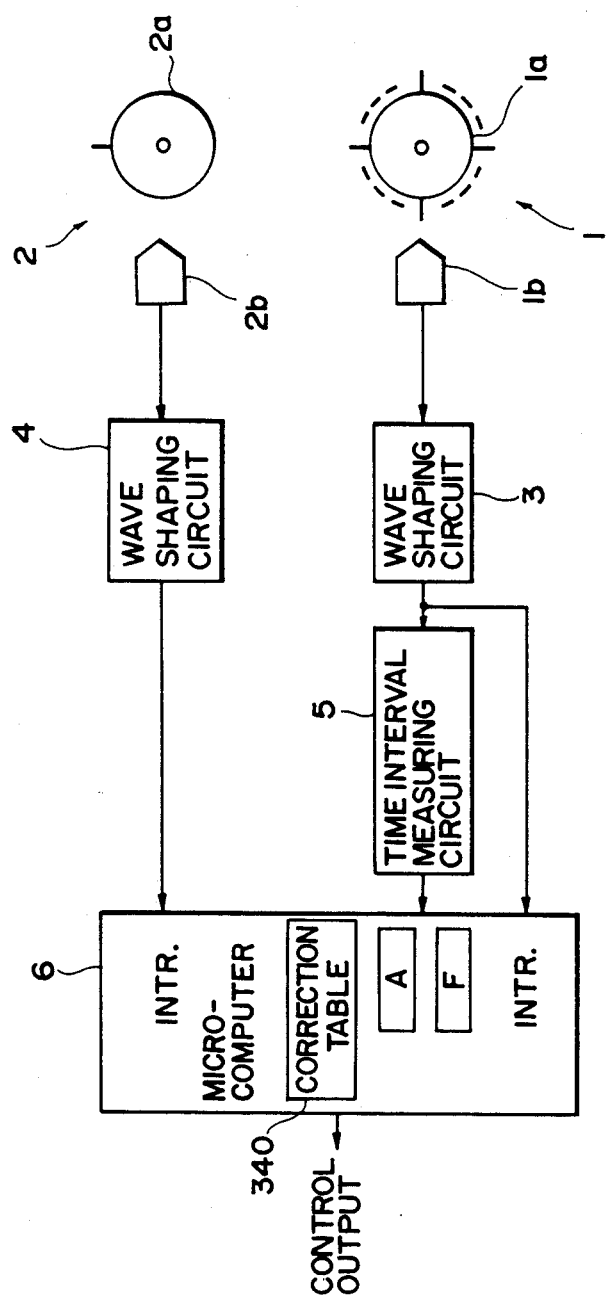

TIME INTERNAL MEASURING APPARATUS AND METHOD FOR A REVOLUTION SENSOR

BACKGROUND OF THE INVENTION

The present invention relates to an apparatus and a method for measuring a time interval between scale pulse signals received when a revolution sensor, such as a revolution angle sensor or a revolution speed sensor, detects a revolution of a predetermined angle.

As is well known, a revolution sensor to be used as a revolution angle sensor or a revolution speed sensor provides a pulser and a pickup. The pulser, a disk fixed to a rotating shaft of a rotary machine for detecting a revolution angle, rotates with the rotary shaft. The peripheral face of the pulser provides cogs or poles formed at predetermined angle spacings. The pickup, fixed adjacent to the peripheral face of the pulser, generates a voltage signal whenever a cog or pole of the pulser passes by. This voltage signal is shaped into a pulse signal, and thus a scale pulse signal is produced whenever the rotary machine rotates an angle corresponding to a formed angle between the cogs or poles.

In the fuel injection control of a diesel engine in which a supply of fuel from a fuel injection pump to a fuel injection valve is controlled by an electromagnetic valve; a revolution angle of the fuel injection pump is detected by a revolution angle sensor every 10° for example, a spacing time of each scale pulse signal given by this detection is measured, and based on the spacing time thus measured, the width of a revolution angle corresponding to a set of injection quantity is converted to a time width. The converted time width causes the electromagnetic valve to supply fuel in a time-controlled manner. Any error, existing in the formed angle between the cogs or poles of the revolution angle sensor, would not allow a correct time interval corresponding to a unit revolution angle of 10° to be obtained, and consequently, cause an error in the time control of the electromagnetic valve. Therefore, the cogs or poles should be formed to obtain exact predetermined angles. This need is not only for fuel injection control, but is commonly utilized in any control system using a time interval which corresponds to a unit revolution angle detected by a revolution angle sensor.

However, from the manufacture standpoint, it is hard to form the cogs or poles with completely the same angle between them. For this reason, in the prior art of measuring a time interval between each scale pulse signal, an error occurs in the measured timer interval due to an error in the formed angle between the cogs or poles.

SUMMARY OF THE INVENTION

It is an object of the present invention to provide an improved timer interval measuring apparatus and method for a revolution sensor.

Another object of the present invention is to provide a time interval measuring apparatus and method which can correct an error in a time interval derived from a formed angle between cogs or poles.

The above and other objects are attained by a time interval measuring apparatus for a revolution sensor, comprising;

pulse time interval measuring means for receiving scale pulse signals when the revolution sensor detects a unit revolution angle and, for measuring a time interval between the scale pulse signals.

correction coefficient supplying means for producing correction coefficient corresponding to the measured time interval, the correction coefficient being decided by an actual value of the unit revolution angle detected by the revolution sensor and by a design value of the unit revolution angle detected by the revolution sensor and being used for correcting the measured time interval to correspond with the design value; and time interval correcting means in response to the measured time interval and the correction coefficient, for correcting the measured time interval by the correction coefficient so that the measured time interval corresponds to the design value.

Above and other objects are also attained by a time interval measuring method for a revolution sensor comprising the following steps of: inputting a scale pulse signal when the revolution sensor detects a unit revolution angle;

measuring a time interval between the inputted scale pulse signals;

identifying the input scale pulse signals based on a reference pulse signal to detect a specified scale pulse signal;

obtaining a correction coefficient which is calculated from a rate of the actual value of the unit revolution angle detected by said revolution sensor and design value of the unit revolution angle and corresponds to the time interval between the input scale pulse signals, from a correction table which stores each correction coefficient for correcting each measured time interval based on the identification of the inputted scale pulse signals; and correcting measured time interval by using the corresponding correction coefficient.

BRIEF DESCRIPTION OF THE DRAWINGS

The foregoing and other objects, features and advantages of the present invention will be appreciated upon a better understood of the following description and accompanying drawings wherein;

FIG. 2 is a block diagram showing a preferred embodiment of a time interval measuring apparatus according to the present invention;

DETAILED DESCRIPTION OF THE INVENTION

Figure 1:
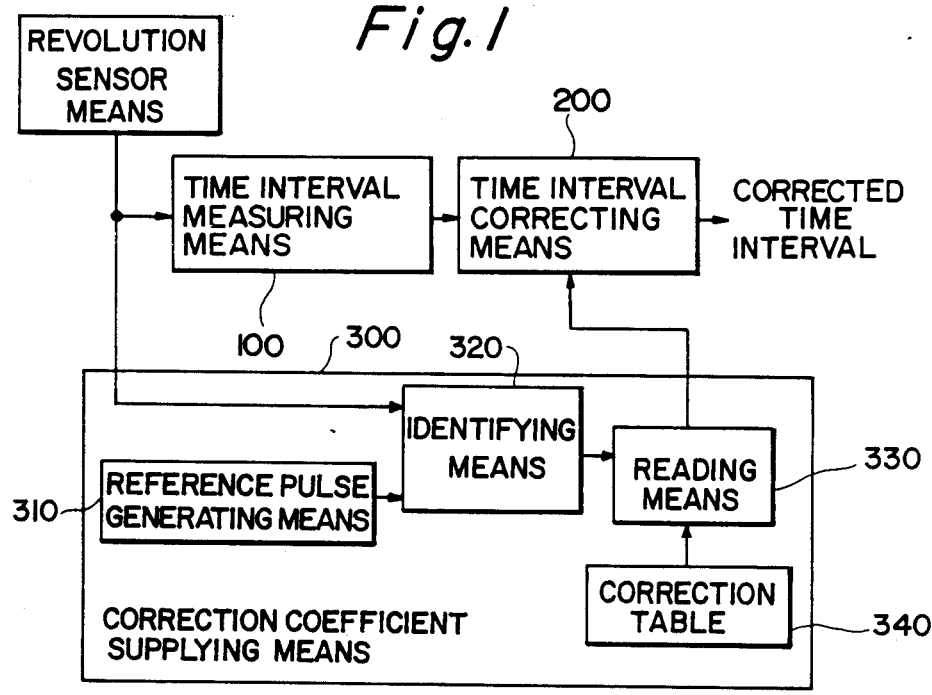
FIG. 1 is a block diagram showing a fundamental embodiment of a time interval measuring apparatus according to the present invention.

In the fundamental embodiment of FIG. 1, a scale pulse signal is received by the pulse time interval measuring means 100 when a revolution sensor detects a unit revolution angle. The pulse time interval measuring means 100 measure a time interval between each scale pulse signal and provides a measured time interval to time interval correcting means 200. Correction coefficient supplying means 300 provides the time interval correcting means 200 a correction coefficient, predetermined for each time interval between the scale pulse signals by an actual value of the unit revolution angle detected by the revolution sensor and a design value of the unit revolution angle. The time interval correcting means 200 correct the measured time interval of the pulse time interval measuring means 100 by using the correction coefficient so that the measured time interval corresponds the design value of the unit revolution angle. Therefore, even if an error occurs in the time interval between the scale pulse signals by an error in the formed angle of cogs or poles, the time interval corresponding to the design value of the unit revolution angle is produced. The contents of this fundamental embodiment may be understood more clearly by the preferred embodiment of FIG. 2.

In the preferred embodiment of FIG. 2, reference numeral 1 is the first revolution sensor, and reference numeral 2 is the second revolution angle sensor. A pulser 1a of the first revolution angle sensor 1 provides around its periphery 36 cogs designed and formed to have a 10° spacing. A pulser 2a of the second revolution angle sensor 2 provides a single cog on its periphery. The pulser 1a of the first revolution angle sensor 1 and the pulser 2a of the second revolution angle sensor 2 are fixed to a rotary shaft of a rotating machine like a fuel injection pump (not shown), and rotate with the rotary shaft. An electromagnetic pickup 1b of the first revolution angle sensor 1 is set adjacent to the periphery of the pulser 1a, and detects each cog of the pulser 1a which rotates with the rotary shaft of the rotating machine, based on the variations of magnetic flux occurring when each cog of the pulser 1a passes. A detected signal of the electromagnetic pickup 1b of the first revolution angle sensor 1 is pulse-shaped through a wave shaping circuit 3, and thereby 36 scale pulses are formed with every unit revolution angle coinciding with the formed angle between cogs of the pulser 1a, from the first revolution angle sensor 1 against one rotation of the rotary shaft of the rotary machine. An electromagnetic pickup 2b of the second revolution angle sensor 2 is set adjacent to the periphery of the pulser 2a and detects each cog of the pulser 2a which rotates with the rotary shaft of the rotating machine. A detected signal of the electromagnetic pickup 2b of the second revolution angle sensor 2 is pulse-shaped through a wave shaping circuit 4, and thereby a reference pulse per rotation of the rotating shaft of the rotary machine is produced. The pulser 1a of the first revolution angle sensor 1 and the pulser 2a of the second revolution angle sensor 2 are fixed to the rotary shaft of the rotating machine so that a reference pulse occurs between a specified scale pulse and a scale pulse immediately before the former.

Figure 3:
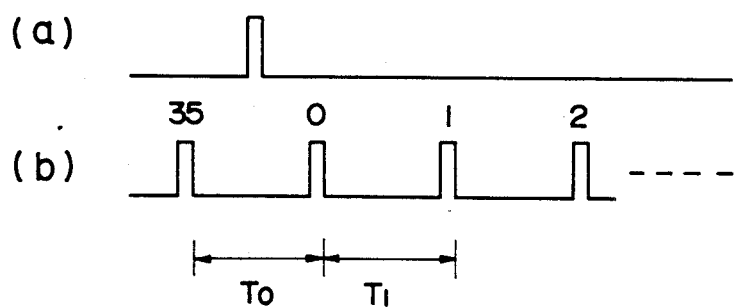
FIG. 3 is a drawing for explaining the function of the pulse time interval measuring circuit of FIG. 2.

A reference numeral 5 is a pulse spacing measuring circuit. The pulse spacing measuring circuit 5 which includes a counter, a latch circuit and a clock generator etc., receives a scale pulse from the wave shaping circuit 3 and measures the time interval between the scale pulses and retains the measured time interval while the time interval of the following scale pulses are measured. FIG. 3 is a pulse time interval measuring circuit 5. A signal (a) shows a reference pulse signal, and a signal (b) shows a scale pulse signal. Each scale pulse, as described later, is identified by sequence numbers 0 through 35, starting with a scale pulse immediately after a reference pulse as designated to be 0. The pulse time interval measuring circuit 5 measures each of the time interval $T_0$ through $T_{35}$ from the trailing edge of a scale pulse to the trailing edge of the following scale pulse, and retains, for example, a time interval $T_0$ of a previously measured scale pulse with sequence number 0 while a time interval $T_1$ of a scale pulse with sequence number 1 is measured.

Figure 4:
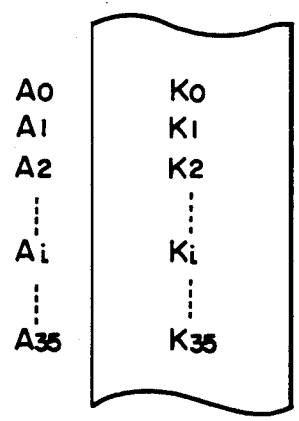
FIG. 4 is an explanatory drawing of the correction table stored in the microcomputer of FIG. 2.
Figure 5:
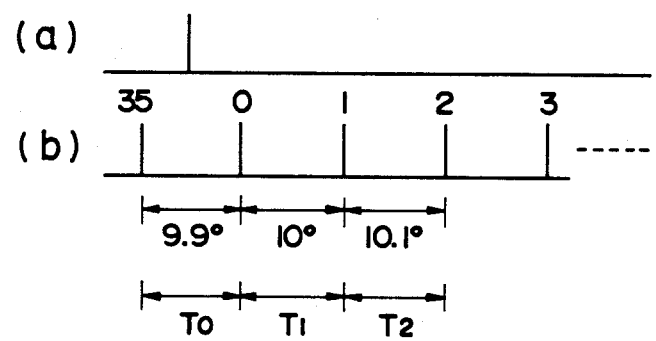
FIG. 5 is a drawing for explaining the correction coefficient stored in the correction table.

Reference numeral 6 is a microcomputer. The microcomputer 6 receives a scale pulse from the wave shaping circuit 3 and a reference pulse from the wave shaping circuit 4 as interrupt signals and receives each time interval $T_0$ through $T_{35}$ of the scale pulses measured in the pulse time interval measuring circuit 5. A ROM (Read Only Memory) of the microcomputer 6, stores, together with control programs and so on, a correction table in which correction coefficients corresponding to the time interval $T_0$ through $T_{35}$ of the scale pulses measured in the pulse time interval measuring circuit 5. FIG. 4 is an explanatory drawing of the correction table, and FIG. 5 is a drawing for explaining the determination of the correction coefficients. In FIG. 5, a signal (a) shows a reference pulse signal, and a signal (b) shows a scale pulse signal. The correction coefficients $K_0$ through $K_{35}$ of FIG. 4 correspond to the spacing times $T_0$ through $T_{35}$ of the scale pulses, respectively. The correction coefficients $K_0$ through $K_{35}$ are stored in addresses $A_0$ through $A_{35}$ which are based on the sequence numbers of the scale pulses. The correction coefficients $K_0$ through $K_{35}$ are determined by dividing a design value $\theta_s$(10° in this embodiment) of a unit revolution angle by an actual value $\theta_i$ of the unit revolution angle actually detected by the revolution angle sensor 1. Namely, if the actual value $\theta_i$ of the unit revolution angle between the trailing edge of the scale pulse with sequence number 35 and the trailing edge of the scale pulse with sequence number 0 is 9.9°, the correction coefficient $K_0$ corresponding to the time interval $T_0$ is $K_0=10/9.9$. Similarly, the correction coefficient $K_1$ corresponding to the time interval $T_1$ is $K_1=10/10$, and the correction coefficient $K_2$ corresponding to the time interval $T_2$ is $K_2=10/10.1$. The microcomputer 6 corrects the time intervals $T_0$ through $T_{35}$ received from the pulse time interval measuring circuit 5 to correspond to time intervals $T_0'$ through $T_{35}'$, by multiplying $T_0$ through $T_{35}$ by the corresponding correction coefficients $K_0$ through $K_{35}$. The microcomputer 6 may perform a well-known control operation like a fuel injection control operation by using the corrected time intervals $T_0'$ through $T_{35}'$.

Figure 6:
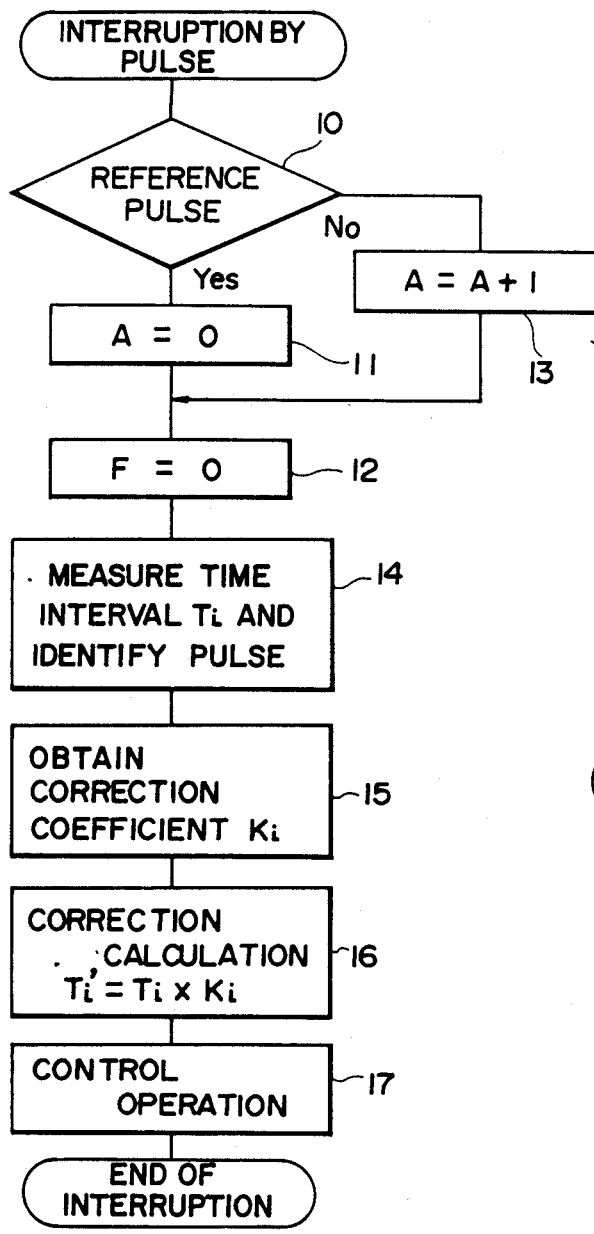
FIG. 6 and FIG. 7 are flow diagrams of the microcomputer of FIG. 2.
Figure 7:
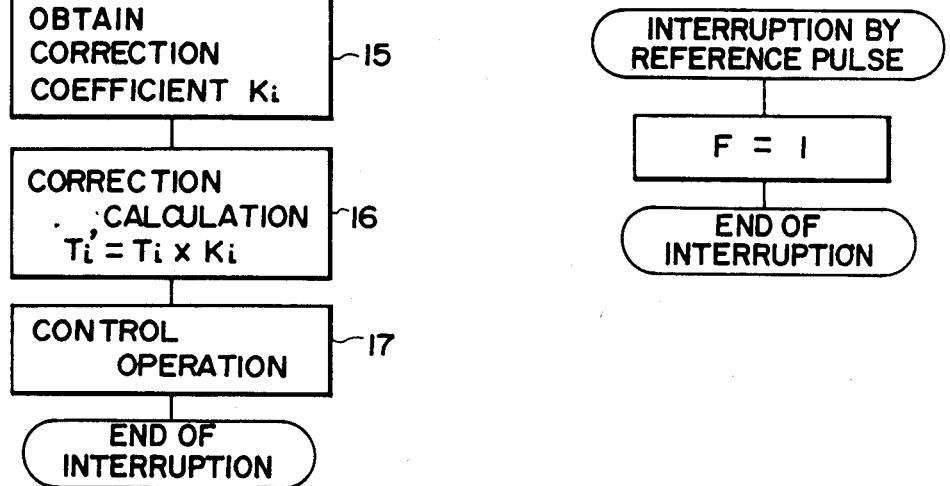

FIG. 6 and FIG. 7 are flow diagrams of the microcomputer 6. FIG. 6 shows an interrupt routine which executes when receiving a scale pulse, and FIG. 7 shows an interrupt routine which executes when receiving a reference pulse.

The microcomputer 6 executes the interrupt of FIG. 6 when receiving a scale pulse, and executes the interrupt of FIG. 7 when receiving a reference pulse. When a scale pulse is received by the microcomputer 6, whether or not a reference pulse has been received between the previous scale pulse and the present scale pulse is determined in step 10. This determination is done by using a flag F which shows the evidence of any interruption by a reference pulse. The flag F, as shown in FIG. 7, is "1" when a reference pulse interrupts, and is "0" upon executing step 12 of FIG. 6. If there is a reference pulse in the step 10, an internal register A for storing the sequence number of a scale pulse in step 11 is reset, followed by the execution of step 12. If a reference pulse is not detected in step 10, the internal register A is increment by *l* in step 13, followed by the execution of step 12. The flag F is set to "0" in step 12, and in the following step 14, a measured time interval $T_i$ is received from the pulse time interval measuring circuit 5. In step 15, a correction coefficient $K_i$ corresponding to the time interval $T_i$ is read out from the correction table based on the sequence number stored in the internal register A. In a step 16, a corrected time interval $T_i'$ is determined by multiplying the time interval $T_1$ by the correction coefficient $K_i$. For example, if the actual value of the unit revolution angle from the trailing edge of the scale pulse with sequence number 35 to the trailing edge of the scale pulse with sequence number 0 is 9.9 (see FIG. 5), the corrected time interval $T_0'$ is given by the following formula:

$$T_0' = T_0 \times (10/9.9)$$

Consequently, the time interval $T_0$ corresponding to the actual value of the unit revolution angle is corrected to correspond to the design value 10° of the unit revolution angle. In step 17, a control operation using the corrected spacing time $T_i'$ can be performed, and then the main operations of the fuel-injection-control process is resumed.

The correction table may be prepared for each product, generally it can be prepared for each production lot. Namely, in the same production lot where products are manufactured in the same conditions and errors in forming cogs appear similarly in each product, a correction table prepared based on any 1 or 2 products in a lot can be applied to all products in the same lot.

The above-mentioned embodiment can be applied totally to a revolution speed sensor, too. Also, the above-mentioned embodiment is applicable to a revolution sensor with a pulser having poles or slits instead of cogs, too.

As described in detail, according to the present invention, the time interval between output pulses of a revolution sensor is corrected so that the time intervals corresponds to the design value of the unit revolution. Therefore, it is possible to produce a time interval corresponding to the design value of the unit revolution angle by correcting any errors derived from the formed angle of the cogs or poles.

From the foregoing it will now be apparent that a new and improved time interval measurement for a revolution sensor has been described above. It should be understood of course that the embodiment disclosed is merely illustrative and is not intended to limit the scope of the invention. Reference should be made to the appended claims, therefore, rather than the specification as indicating the scope of the invention.

What is claimed is:

1. An apparatus for measuring time intervals between pulses, comprising:
   revolution sensor means for measuring an angle of rotation;
   said revolution sensor means including,
      a pulser which rotates at arbitrary speed, and
      a pulse pickup which is fixedly arranged;
   said revolution sensor means producing n pulse signals per one rotation of said pulser by said pulse pickup detecting n marks which are formed on said pulser;
   said pulser having n revolution angle values which depend on formed angles between said marks, each of said pulse signals occurring when an angle is detected;
   pulse time interval measuring means, responsive to said pulse signals, for measuring time intervals between said pulse signals and producing measured time interval signals;
   correction coefficient supplying means, responsive to said pulse signals, for providing n correction coefficients corresponding to said measured time interval signals;
   said correction coefficient supplying means including a correction table in which said correction coefficients have been stored as predetermined fixed data, each of said correction coefficients being a value which has been set by a ratio of a predetermined unit revolution angle design value and each of said unit revolution angle actual values, said unit revolution angle actual values being values which have been predetermined based on an actual measurement; and
   time interval correcting means, responsive to said measured time interval signals and said correction coefficients, for correcting each of said measured time interval signals by a corresponding correction coefficient of said correction coefficients so that each of said measured time interval signals corresponds to said predetermined unit revolution angle design value.

2. The time interval measuring apparatus as claimed in claim 1, wherein said correction coefficient is determined by $\theta_s/\theta_i$, where $\theta_s$ is said predetermined design value and $\theta_i$ is said actual value; and wherein
   said measured time interval is corrected according to a calculation formula $T_i' = T_i \times (\theta_s/\theta_i)$, where $T_i'$ is said corrected time interval and $T_i$ is said measured time interval.

3. The apparatus as claimed in claim 1, wherein said correction coefficient supplying means further comprise:
   reference pulse generating means for generating a reference pulse signal to detect a specified pulse signal of said pulse signals;
   identifying means, responsive to said reference pulse signal and said pulse signals, for identifying each of said pulse signals with a sequence number which is assigned to each of said pulse signals starting with said specified pulse signal being a first signal; and
   reading means, responsive to said sequence number from said identifying means, for obtaining a correction coefficient corresponding to each of said measured time interval signals from said correction table based on said sequence number, each of said correction coefficients having been stored as fixed data at an address based on the sequence number.

4. An apparatus for measuring time intervals between pulses, comprising:
   revolution sensor means for measuring an angle of rotation;
   said revolution sensor means including,
      a pulser which rotates at an arbitrary speed, and
      a pickup which is fixedly arranged;
   said revolution sensor means producing n pulse signals per rotation of said pulser by said pickup detecting n marks which are formed on said pulser;
   said pulser having n revolution angle actual values which depend on formed angles between said marks, each of said pulse signals occurring when an angle is detected;
   pulse time interval measuring means, responsive to said pulse signals, for measuring time intervals between said pulse signals and producing measured time interval signals;

correction coefficient supplying means responsive to said pulse signals, for providing n correction coefficients corresponding to said measured time interval signals;

said correction coefficient supplying means including a correction table in which said correction coefficients have been stored as predetermined fixed data, each of said correction coefficients being a value which has been set by a ratio of a predetermined unit revolution angle design value and each of said unit revolution angle actual values, said unit revolution angle actual values being values which have been predetermined based on an actual measurement; and time interval correcting means, responsive to said measure time interval signals and said correction coefficients, for correcting each of said measured time interval signals by a corresponding correction coefficient of said correction coefficients so that each of said measured time interval signals corresponds to said predetermined unit revolution angle design value;

said revolution sensor means being used in a diesel engine for controlling a supply of fuel from a fuel injection pump to a fuel injection valve; and said pulser being fixed to a rotary shaft of said fuel injection pump, thereby causing said corrected time intervals to be used as an operation factor in fuel injection control.

5. A method for measuring time intervals between pulses, comprising the steps of:
(a) receiving n pulse signals per rotation from a revolution sensor device which includes a revolution sensor having a pulser that rotates at an arbitrary speed and a pickup that is fixedly arranged, the revolution sensor having unit revolution angle actual values which depend on formed angles of marks located on the pulser, each of the pulse signals occurring at an angle detected by the revolution sensor;
(b) measuring time intervals between the pulse signals;
(c) producing measured time interval signals;
(d) identifying the pulse signals based on a reference pulse signal which designates a specified pulse signal of the pulse signals;
(e) obtaining n correction coefficients corresponding to each of the measured time interval signals from a correcting table in which the correction coefficients are predetermined and stored as fixed data based upon identification of the pulse signals, each correction coefficient being a value which has been determined by a ratio of a predetermined unit revolution angle design value and each of the unit revolution angle actual values, the unit revolution angle actual values being values which have been previously established based on an actual measurement; and
(f) correcting each of the measured time interval signals by a corresponding correction coefficient of the correction coefficients so that each of the measured time interval signals corresponds to the predetermined unit revolution angle design value.

6. The time interval measuring method as claimed in claim 5, wherein said correction coefficient is given by $\theta_s/\theta_i$ where $\theta_s$ is said predetermined design value and $\theta_i$ is said actual value; and wherein said measured time interval is corrected according to a calculation formula $T_i' = T_i \times (\theta_s/\theta_i)$, where $T_i'$ is said corrected time interval and $T_i$ is said measured time interval.

7. A method as claimed in claim 5, wherein the pulse signals are identified by a sequence number assigned to each of the scale pulse signals starting with the specified scale pulse signal as a first signal; and wherein each of the correction coefficients corresponding to each of the measured time interval signals has been stored at an address based on the sequence number and is obtained from the correction table based on the sequence number.

8. A method for measuring time intervals between pulses, comprising the steps of:
(a) receiving n pulse signals per rotation from a revolution sensor device which includes a revolution sensor having a pulser that rotates at an arbitrary speed and a pickup that is fixedly arranged, the revolution sensor having n unit revolution angle actual values which depend on formed angle of marks located on the pulser, each of the pulse signals occurring at an angle detected by the revolution sensor;
(b) measuring time intervals between the pulse signals;
(c) producing measured time interval signals;
(d) identifying the pulse signals based on a reference pulse signal which designates a specified pulse signal of the pulse signals;
(e) obtaining n correction coefficients corresponding to each of the measured time intervals from a correction table in which the correction coefficients are predetermined and have been stored as fixed data based on identification of the pulse signals, each correction coefficient being a value which has been determined by a ratio of a predetermined unit revolution angle design value and each of the unit revolution angle actual values, the unit revolution angle actual values being values which have been previously established based on an actual measurement;
(f) correcting each of the measured time interval signals by a corresponding correction coefficient of the correction coefficients so that each of the measured time interval signals corresponds to the predetermined unit revolution angle design value; and controlling a supply of fuel from a fuel injection pump to a fuel injection valve by utilizing the corrected time interval signals as an operation factor in a fuel injection control process.

* * * * *